United States Patent

Gorshkov

[11] Patent Number: 6,099,368
[45] Date of Patent: Aug. 8, 2000

[54] ROCKING SHIP PROPULSION AND THE ROCKING PROPELLED SHIP

[75] Inventor: Vladislav Vasilyevich Gorshkov, Arlington, Va.

[73] Assignee: Vladislav V. Gorshkov, Arlington, Va.

[21] Appl. No.: 09/323,857

[22] Filed: Jun. 7, 1999

[51] Int. Cl.[7] .................................................. B63H 19/02
[52] U.S. Cl. .................................................. 440/9; 440/13
[58] Field of Search .................................. 440/9, 10, 22, 440/14, 15

[56] References Cited

U.S. PATENT DOCUMENTS

| | | | |
|---|---|---|---|
| 3,453,981 | 7/1969 | Gause | 440/9 |
| 3,861,487 | 1/1975 | Gill | 440/10 |
| 4,332,571 | 6/1982 | Jakobsen | 440/9 |
| 4,968,273 | 11/1990 | Momot | 440/22 |

FOREIGN PATENT DOCUMENTS

| | | | |
|---|---|---|---|
| 30893 | 2/1983 | Japan | 440/9 |
| 133997 | 8/1983 | Japan | 440/9 |

*Primary Examiner*—Ed Swinehart

[57] ABSTRACT

For any directed sea waves the rocking propelled ship can reach high speeds if it utilizes an sea waves energy by means of

1. A rocking propulsor, which is a couple of hydrofoils kept elastic cross by pivots on the extreme points of streamline narrow keel-rocker, extended far out off long sizes of the ship and thus wags hydrofoils vertically with a speed and an amplitude being sufficient for its proper work;
2. A "pendulum design" of a rocking propelled ship, described by a light wide body with weight, concentrated in a middle lowest ship's part and having a vertical keel with a heavy bob. This design provides the highest efficiency of an energy transmission from waves to ship rocking.

In case of need to increase ship's speed some more its rocker should be rigged by an on-board oscillator, which is a central heavy flywheel, which is alternately twisted up to speed by a serve motor in both directions on cross axle in time (resonance) of ship rocking. In order to accelerate and change revolution directions without energy loss the flywheel is supplied by spring returners.

If the ship is assigned to navigate in both sea state cases (high or calm) the oscillator is mounted into the rocking propulsor, which is attached to the ship bottom with a hinger. It can be locked to the bottom to be swinged by a rocking ship hull to propell the ship by wave generated rocking motion. It can be unlocked to be swinged by the board oscillator undependently from the ship hull to propel the ship in case of calm sea.

7 Claims, 5 Drawing Sheets

ROCKING SHIP PROPULSION AND THE ROCKING PROPELLED SHIP

CROSS-REFERENCE TO RELATED APPLICATIONS

Not Applicable.

STATEMENT REGARDING FEDERALLY SPONSORED R & D

The invention has been created by the author himself with his own means in duty free time.

REFERENCE TO A MICROFICHE APPENDIX

Not Applicable.

BACKGROUND OF THE INVENTION

Endeavor:

The rocking ship propulsion is a method to propel a ship by utilizing its rocking, enforced by either waves or an artificial oscillating system. This kind of ship propulsion may be used for new ships and for already operated ships. The method is distinguished from the well-known methods, based on the direct utilization of wave motion for a ship propulsion with a foil-type wave propulsion system [1].

The Rocking Propelled ship (RP-ship) is a ship, which utilizes the rocking for self propulsion. An energy of ship's pitching and heaving is converted into the propulsion. Sea waves or an artificial oscillator make a ship to pitch and to heave, providing a mechanical energy necessary to move the ship. Thus, a RP-ship runs less an engine and fuel spending.

In case of a calm sea the RP-ship may have an artificial rocking system or a service engine and a propulsor. In the worst case, it must wait waving. The following categories of issues can use the rocking-propelled ship technology: boating, shipbuilding, shipping, sure remedies, ecology, oceanographic researches, navy etc.

The principle problem addressed in invention.

Pitching, heaving and other kinds of ship rocking are always considered as negative process because they interfere with ships navigation. Usually a fleet settles when a sea runs high. Sometimes the sea becomes dangerous for ships (vessels, crafts, boats and other floating means) and for their crews. During a storm it becomes impossible to help people on board, if the ship has a floating wreck.

The seas energy is pitching and tossing ships and it may be harmful for them. The object of this invention is to find and show the way to use the ship rocking motion for self propulsion. Better of all is if a ship rocking is enforced by sea waves as usually. Reason of this is an abundance of the wave energy in oceans, seas and big lakes.

But if a sea is calm or a ship needs to speed, an artificial rocking system (an oscillator) may be used. For the ordinary ships, rigged by the rocking propulsor (R-propulsor), the problem does not exist. They can use also their issued engines and propulsors.

The energy consideration of a ship rocking.

Each ship is a receiver of seas energy. And as it is well known if a ship receives energy more then the ship is worse. Now all will be just the other way round. That ship will be better because she may go with the R-propulsor faster. A ship receives and loses wave energy at the same time due to self inertia and direct water damping. A part of that wave energy is accumulated by ship, and we may watch it as the rocking. In every time the sea power is spended to overcome dissonance between the ship self rocking process and sea waving so the sea power expenditure can exceed the main engine power a few times.

All known inventions directly try to utilize the said dissonance or relative wave motion for the ship propulsion and do not have perceptible results because an energetic potential of the said dissonance significantly smaller than the total wave energy potential. Besides they use only a part of that dissonance energy and don't provide the proper conditions of operating foils on commercial ship velocities.

For the total wave energy extraction for ship propulsion, here is selected a pendulum ship outline accorded with wave process. The only converter "rocking to propulsion" resists against the waving process but it propels the pendulum type ship.

Division of the principle problem into problems.

To propel a ship by rocking we have to solve three of the most important problems.

The first one is to make a ship be able to receive and to transmit wave energy loss-free.

The second is to use the energy for the ship propulsion. It means the RP-ship should be equipped with a R-propulsor. This is a special device for the conversion of the rocking energy to thrust when R-propulsor is swayed by a ship or an oscillator.

The third one is restriction of the rocking process, which may be harmful for the ship and its crew. It will be solved by a damping the rocking.

Additional problems.

The solving of other problems provide a navigation and an operation of a RP-ship. Among them are:

the invented RP-ship manufacture, propulsor's maintenance, renovation of the ordinary ships to RP-ships, ship steering and maneuvering, rigging the ship by additional service propulsion and electric power system, search for the best usage outline, interaction and co-operating with other kinds of ships.

The RP-ship benefits.

The immediate results of RP-ships are:

navigation without fuel expenses (the waving has to be present, otherwise during the sea is quiet, a service engine or an oscillator should be used), an increased seaworthiness and a safety of the navigation, a reduction of noise, no soil of air and water, a reduction of ship rocking, no ship rejection aground by waves because the RP-ship goes easy in a head sea.

The RP-ship will open a new history of humanity. This includes settlement and living into seas and oceans without polluting them and the air. This is rediscovering of their natural resources. This is the fast intensification of a maritime, safety of a transportation, boating, fishing, researches and etc.

BRIEF SUMMARY OF INVENTION

The general idea of the claimed invention is the conversion of the ship rocking (made by the seas or/and an artificial oscillator) to the ship propulsion. The most interesting reason for ship rocking is the energy of seas. The invention opens the real way to use this energy.

Solution of the problem is based on the consideration of a ship as an oscillating system accepting this energy so much as it is enough to run faster than an engine propelled ship. The ship, as an oscillating system, should be coordinated with the wave period for minimizing the energy losses. For the best receiving and temporary accumulating energy, the ship mass center C should be below the pitch center O (FIG. 1b) and even the ship bottom. The ship becomes like a physical pendulum, which are swayed by the seas or/and by a special oscillator. In this case we will say the ship is made as a pendulum type.

The ship propulsion and the damping of a superfluous rocking are accomplished by a R-propulsor. The ship body is rocking and swinging the R-propulsor, expending out of the ship long dimension. The R-propulsor converts swings to the propulsion by elastic flopping hydrofoils, installed on its extreme points with the cross shafts. The rocking ship propulsion may be used for renovated issued ships as well as for new specially designed RP-ships.

BRIEF DESCRIPTION OF SEVERAL VIEWS OF DRAWING

FIGS. 1(A,B). Actions of the couple of gravity and buoyancy forces to the ships (a-ordinary, b-pendulum type). In the first case the couple of the forces hinders a sea to turn the ship. In the second case it helps a sea to sway the ship.

FIGS. 4(A–C). The basic parameters of the RP-ship. The drawings show a view of the RP-ship, the basic dimensions and the angle movements, converted to the propulsion.

FIGS. 6(A–C). The conversion of the ship rocking to her propulsion with two swayed foils (converters). It shows how the flopping hydrofoils convert the swings to the thrust.

FIGS. 7(A–G). The one of possible designs of the RP-ship with a collapsible R-propulsor. We see the details of the RP-ship in different positions and the R-propulsor's design.

FIGS. 8(A–C). The diagrams of the ships rocking behavior, enforced waves. It shows why the ordinary ship may have the pitch greater but with smaller efficiency than a RP-ship.

LIST OF SIGNS AND ABBREVIATIONS.

| | | |
|---|---|---|
| 1 -vertical part of P-keel, | 10 -foil deflection spring, | 21 -deceleration zone, |
| 2 -bob of P-keel, | 11,12 -foil deflection ropes, | 22 -idle stroke loop, |
| 3 -rocker of R-propulsor, | 13 -foil deflection iever, | 23 -work stroke loop, |
| 4 -flopping hydrofoil, | 14,16 -holder rope benders, | 24 -rock-damping loop, |
| 5 -heavy flywheel, | 15 -sprocket of the lever, | 25 -transition to rock-stop, |
| 6 -hydrofoil's holder, | 17 -chain meshing sprockets, | 26 -transition to the work, |
| 7 -rocker end axle, | 18 -sprocket of the foil shaft, | 27 -none-pendulum type, |
| 8 -hydrofoil shaft, | 19 -key fixing gear on shaft, | 28 -for pendulum type, |
| 9 -sliding arm of rocker, | 20 -propulsor hinger, | $g = 9.81$ m/sec$^2$ -downward acceleration constant (Earth). |
| x,y -coordinates of trace, | t -trim (angle) of a ship, | s -sea's slope, |
| x -point of diagram loop, | f-round frequency, | y -foil trace ordinate, |
| i -loop line inclination, | p -pitch angle, | o -coordinate's center, |
| A -arm of force couple, | I -flow attack angle, | S- maximum sea slope, |
| B -buoyancy force, | J -pitch moment of inertia, | T -wave period, |
| F -tangent flow angle, | K -hydrofoil area, | U -vertical flow velocity, |
| C - mass center, | L -rocker length (span), | V -ship velocity, |
| D - hydrofoil deflection, | M -ship mass, | W -tangent foil velocity, |
| E -eccentricity of hydrofoil, | N -hydrodynamic thrust, | W -work loop path, |
| o -pitch center, | P -maximum pitch angle, | Y- -amplitude of RP, |
| G -ship weight, | R -propulsion force, | Z -pendulum constant |
| H -pendulum length, | Q -damping force, | $\{Z = 4.0243 \text{ sec}^2/m\}$, |
| # -damping start point, | & -work start point, | * -extreme sea slope, |
| CF -capsizing moment, | RA -rotate acceleration, | P-keel -keel-pendulum, |
| RP-ship (rocking propelled), | RF -reactive moment or | Pd -dampened pitch, |
| VoW- volume of work, | recover force moment, | Pw -working pitch, |
| W + A -work + amass energy, | R-propulsor (rocking), | Pi -idle pitch, |
| WL -water line, | Wo -work without P-keel, | pi - 3.1416. |

DETAILED DESCRIPTION OF INVENTION

1. Solution for the first problem—reception, passing of wave and/or board energy.

1.1. The wave energy losses.

Figure 1A:
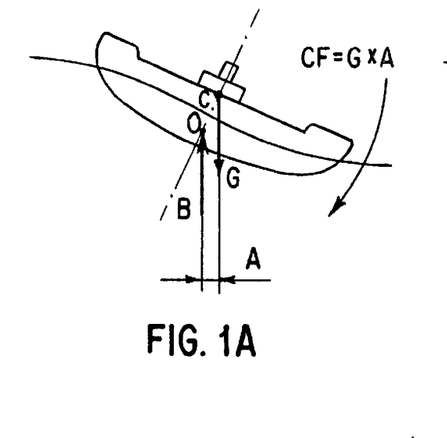

Usually designers desire to make a ship steady against waves. They make it longer in order to get the long/wide ratio more than 5–8 and place the center of the ship gravity above waterline, WL, this is a little lower than ship transverse metacenter (FIG. 1a). They achieve their goal, and the wave energy disappears, overcoming the combined ship resistance (of weight, shape and inertia).

To have a ship to be able to receive and pass more of the wave energy, we have to implement the following. To lighten both ship extremities (a pitch inertia decreasing), to make a ship body wide as well as the long/wide ratio in range 1–5 and with a bottom shape being spherical, elliptical or oval, to lower the ship gravity center below the bottom.

Figure 1B:
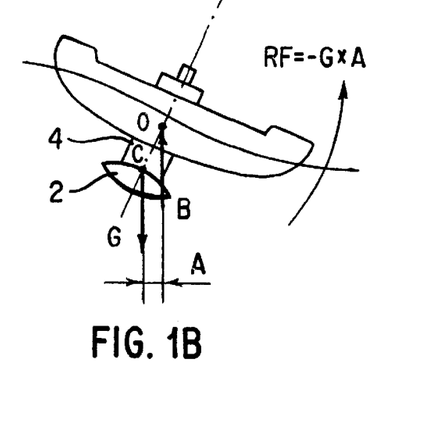

The latter is achieved by mounting a heavy long vertical keel or a keel-pendulum (P-keel) under the ship bottom (FIG. 1b). This allows us to avoid the effect of the ship inertia and gravity to detain its rocking and to waste the wave energy before transmission it to the converters. Now the P-keel saves energy into its swings. In this mobile state the ship is ready to pass the sea energy to the R-propulsor with the maximum efficiency, because now the energy losses are practically absent. This is a ship of the pendulum type.

If we do not get the ideal design, a ship will still receive the sea energy but at less extent. Experiment models show that even though the RP-ship has lost almost all buoyancy, it continues to go forward but at a slower. That means RP-ships may have the highest vitality when ordinary ships perish.

1.2. Choosing parameters for the pendulum type ship.

We can see in FIG. 1 the explanation of advantages when the ship mass center, C, is lower. Each time during one wave period the mass center, C, appears in front and back of the ship pitch center, O. In both cases the capsize force moment, CF, applies to the ordinary ship (FIG. 1a). The wave energy is wasted for straightening of the ship swing reactive opposition, which consists of the capsize force moment, CF, inertia moments of ship pitch and joined water masses.

If the mass center, C, goes into the pitch center, O, the capsize force moment, CF, is absent, because the arm of the force couple equals zero, A=0, and then the wave energy wasted for the straightening only two last parts of the ship swing resistance. If the mass center, C, goes below the pitch center, O, as low as the center of the pendulum (see FIG. 1b), then the restoring force moment, RF, arises and an insignificant part of resistance wastes the sea energy.

That part may be sharply reduced too by choosing an optimal ship bottom shape (oval, spherical, elliptical, etc.). The pendulum ability (to convert the potential energy of the lifted weight G to the kinetic energy of its movement and vice versa) removes practically the ships swing resistance. The optimal distance, H, between the pitch center, O, and the ship mass center, C, may be calculated [2] by the following formulas:

$$H = Z * J / (M * T^2)\_m \quad (1)$$

or $$H = T^2 / Z\_m \quad (2)$$

where:

$Z=(2*pi)^2/g=(2*3.1416)^2/(9.81\ m/sec^2)=4.0243\ (sec^2/m)$,

J—pitch moment of inertia (kg* m^2); M—ship mass (kg);

T—period wave oscillations (sec); signs: /, ^, * are: divide, power, multiply.

The first formula shows us how to neutralize the pitch moment of inertia, detaining a ship pitch. We have only to lengthen the vertical P-keel in order to put the mass center, C, lower and/or to make the bob mass greater. If the pitch moment inertia J is small, we can evaluate a distance between the centers by the simplified second formula.

The ship of the pendulum project (equipped with P-keel) swings it self like the pendulum on seas and takes in any time a position according to sea slope without wasting or accepting energy any more (neutral conduct), if the ship rocking is synchronized with the sea process. Thus the ship has now an idling regime of the rocking and has no energy loss. It is completely ready to pass the received energy to the R-propulsor when it is turned on. Also we can change the ship free pitch period by changing the length of a P-keel so much as it needs to make that period equal to wave swaying period and to have them coincide.

1.3. The utilization of artificial energy.

If we use a board energy then (see FIG. 2) the RP-ship should be equipped by a hollow P-keel with an rotary oscillating heavy flywheel inside. This is the first outline of artificial energy using in order to have a ship rocking. To obtain the twist oscillations, the flywheel has to be installed on the cross shaft and be revolved with speed up by an electric drive and an elastic reseter in turns to different directions. In this case the ship body will get the redirected reactive spin force moment and, as result, will have rocking.

Figure 2:
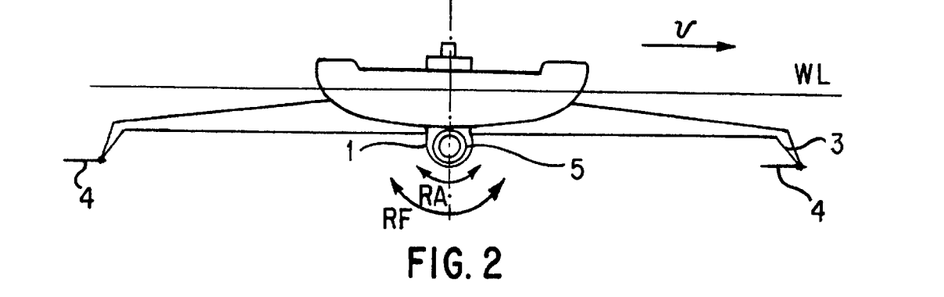
FIG. 2. The generation of artificial rocking with an oscillating rotation of the flywheel. The rotation is periodically redirected by a drive and springs to get the redirected reactive force moment and hence to sway a ship like waves do.

If the period of spin oscillations is identical to the ship self pitch period, our ship will pitch and go under the R-propulsor effect. Artificial and wave swaying must be precisely synchronized to add its actions and to avoid energy wasting. The reactive force moment, RF, is applied to ship body and the R-propulsor.

Figure 3:
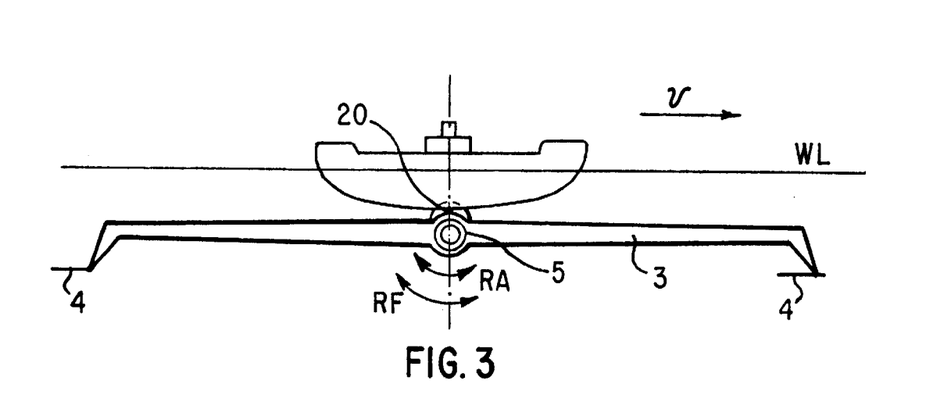
FIG. 3. The independent swaying of the rotary R-propulsor with the flywheel. It may be used without the swaying of a ship for the getting the better results on quiet water.

The second outline is shown in FIG. 3. For more effective rocking propulsion the reactive spin force moment, RF, should be put from an artificial oscillator directly to the R-propulsor only. As a result, the R-propulsor takes the redirected reactive spin force moment, which is swinging it alternately in opposite directions about the cross hinger on the ship bottom.

The second outline may be converted to the first if only the rocker will be locked relatively the ship bottom. Both outlines make a RP-ship independent of the a sea state. It becomes not only a bad weather ship but an all-weather ship. If the sea waves and an artificial energy are used together, both rocking processes have to be synchronized like an electric generators, working in a single power system.

2. Solution for the 2-nd problem: conversion of the rocking to the ship propulsion.

2.1. The rocking propulsor design.

Figures 4A, 4C:
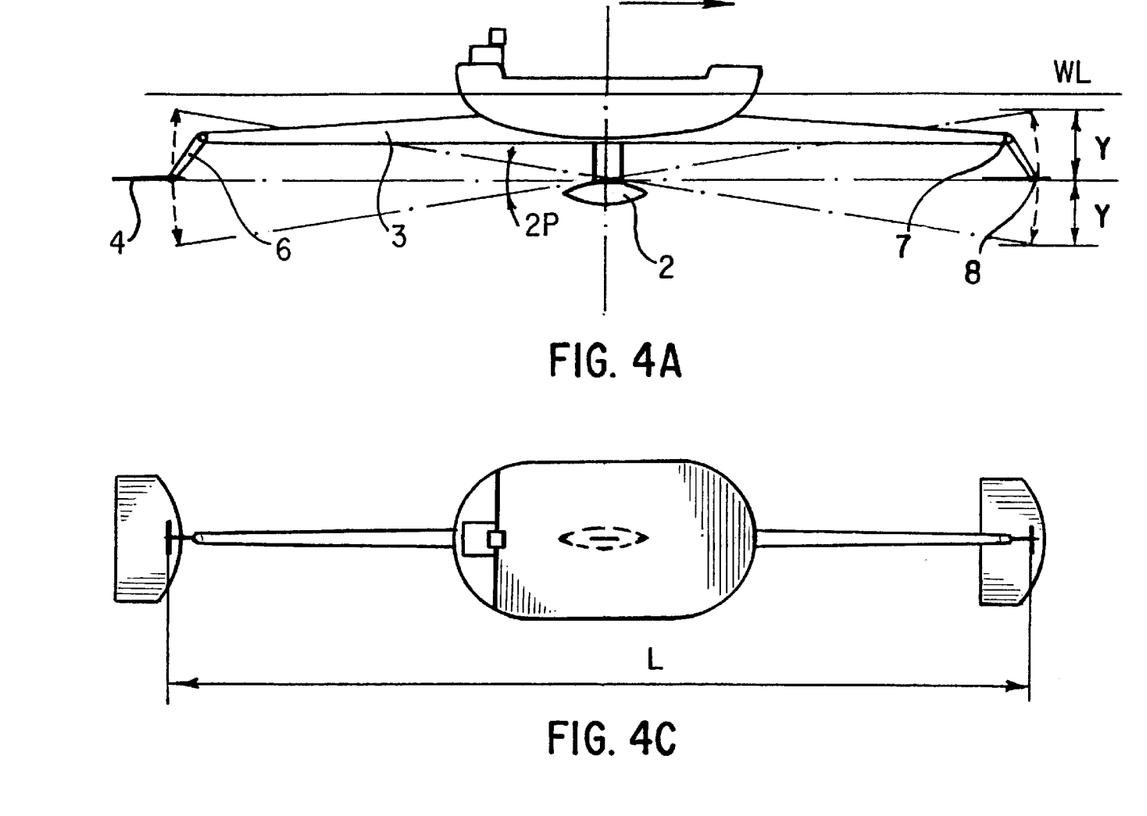
Figure 4B:
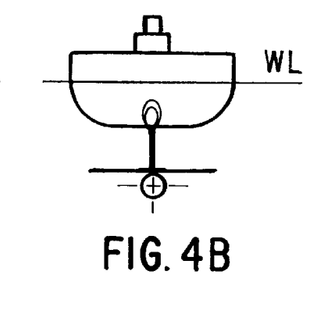

The effective transformation of the ship rocking into a ship's translation is executed by the R-propulsor. This is a couple of hydrofoils, which are able to oscillate onto the extremities of the long liner rocker. The last one may be installed onto the P-keel or directly onto the liner ship keel below it. Both devices may be combined together and be made like a single device (keel-rocker) combining two functions at the same time (FIG. 4), including the fulfillment of the additional roll-damping function like a long low keel-fin.

The vertical P-keel may be designed telescopic. It can be pulled in or set in motion by sliding it up or down (FIG. 4). For the split design of the P-keel (FIG. 6) that operations are executed by the turn apart or together two parts of the P-keel. If we use intermediate angle positions of the bifurcated P-keel, we can change the location of the mass center in order to adjust the period of ship's swings according the period of waves.

When the ship body receives wave energy, she begins to sway the vertical P-keel and the rocker with the hydrofoils onto it's extremities. If the rocker length, L, is longer then the conditions for work of the flopping hydrofoils are better and the efficiency is also greater. In order that the ship motion to be possible ahead sea, the rocker span, L, should be longer than the ship body by 2-5 times. The rocker water damping, the moment of its inertia and the reducing of a ship maneuverability can prevent too long designs.

2.2. The R-propulsor's swinging motions.

Figure 5:
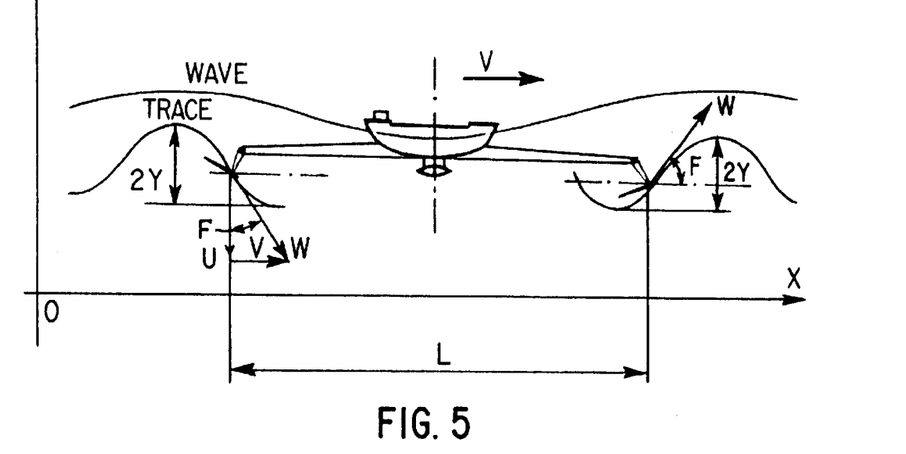
FIG. 5 The dynamic parameters of the R-propulsor and its flopping hydrofoils. It helps to create a basic theory for understanding of the rocking ship propulsion.

How does the R-propulsor work (FIG. 5)? Let's imagine the RP-ship is pitched by waves at maximum angle, P(radians), with round frequency, f, and it goes forward with speed, V. It is clear that RP-ship swings the rocker with the hydrofoils on its ends. Each of them traces line like sinusoid with the vertical amplitude, Y. If the rocker has length, L, the amplitude, Y, and the trace equation, y, for its extreme points or foil shafts are as follows:

$$Y=P*L/2 \quad (3),$$

$$y=Y*\sin(f*x/V) \quad (4),$$

where: x—an abscissa and y—an ordinate of the hydrofoil shaft trace.

Each hydrofoil, installed elastic on a shaft of a proper rocker end, will trail an action of the slope water flow, which a reverse trace, described by the same sine function (4). The maximum vertical speed of hydrofoil, U, as a result of the sinusoid, y, differentiation with respect to x, the maximum flow tangent angle, F, and the tangent flow velocity, W, and the round frequency, f, are as follows:

$$U=f*Y \quad (5),$$

$$F=\text{arctg } (f*Y/V) \quad (6),$$

$$W=V/\cos (D) \quad (7),$$

$$f=2*\text{pi}/T \quad (8),$$

where: T—a wave period (sec.), D—a hydrofoil angular deflection (radians), pi=3.1416.

2.3. The generation of the thrust and damping forces.

Figure 6A:
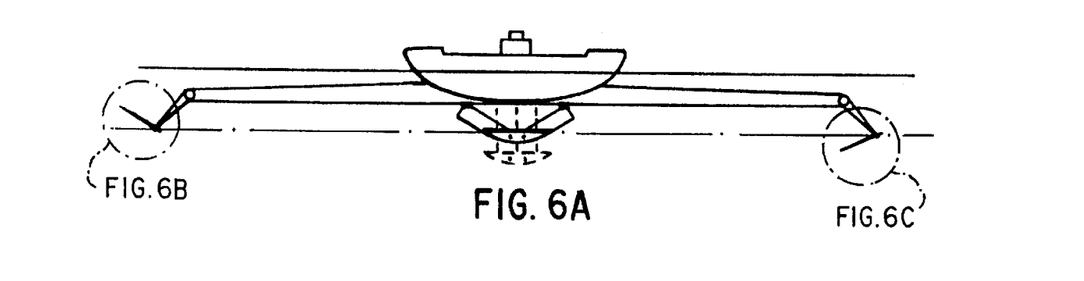
Figure 6B:
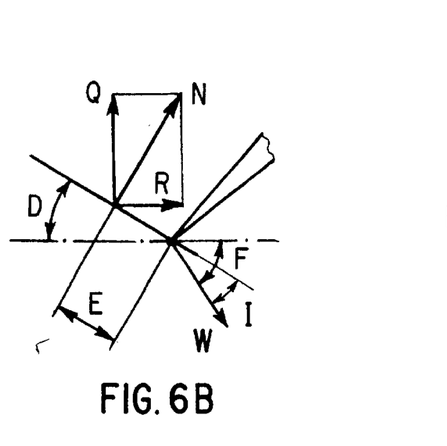
Figure 6C:
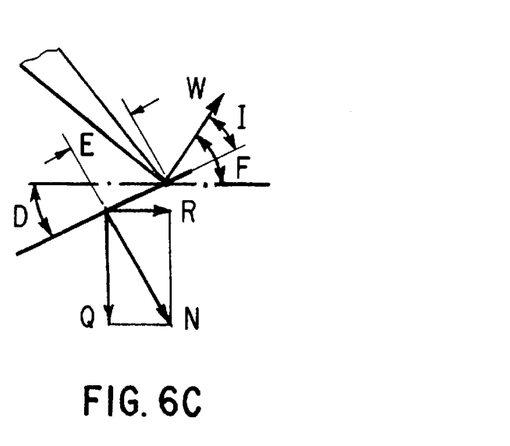

What will each hydrofoil do if it elastically be installed on the horizontal cross shaft with the eccentricity, E (FIG. 6)? If they were still secured and could not turn around axles, keeping them onto rocker extremities, they would only prevent rocking motion and suppress ship rocking. Because the hydrofoil deflects from the horizontal at angle egual zero, D=0, the normal force, N, of hydrodynamic head directs only up or down and does not have the horizontal projection—the thrust, that is also equal zero, R=0.

We set the hydrofoils onto the horizontal cross shafts so as they could elastically deflect around that shafts. In order that the hydrofoils to deflect under an influence of water currents, which appears during a rocker swing process, the area of each of them should be behind shafts. In other words the back eccentricity (shift), E, should be between hydrofoil shaft and the hydrodynamic head center. Then the twist force moment will be created to turn the elastically held hydrofoil at an optimal deflection angle (FIG. 6).

Because the hydrodynamic head force is perpendicular to the deflecting foil plane, this force deflects together with the hydrofoil but from the vertical position. It does not matter which direction the hydrofoil is deflected to, every time the hydrodynamic head force has the horizontal project, directed forward. This is the thrust, applied to the hydrofoil (the pull for fore hydrofoil and the push for aft hydrofoil).

At the same time we have a couple of the opposite vertical rock-damping forces, Q, on both hydrofoils and a couple of the horizontal thrusts, R, directed ahead. The first couple of them creates the restrain force moment, preventing the ship from over-rocking. The second couple of horizontal forces, R, are added together to propel the ship.

If the hydrofoil can freely turn together with the water flow like weather-vane, D=F, and the normal hydrodynamic head force, N, will be absent, and the thrusts will also be zero, R=0, therefore the R-propulsor will work in the idle regime.

2.4. The hydrofoil deflection control.

When D=0, the R-propulsor works like a pitch damper or a rocking suppresser. To obtain the positive result, we have to control the hydrofoil angle position. The propulsive force, R, is at maximum when D=F/2. This control rule may be accomplished by a spring or another mechanical regulator of course if the suppressing rocking force, Q (the vertical path of the normal hydrodynamic head force, N) will not stop the ship pitch totally. If the damping force, Q, is too great and it terminates the ship rocking, permissible foil deflection, D, should be increased.

In the majority of practical cases the optimal angle of hydrofoil deflection, D, has to support the maximum ship motion speed, V. That angle is in the bounders: F/2–F. If we know the angles F and D we can calculate the water attack angle, I=F–D, and forces: the hydrodynamic head, N, the thrust, R, and the rocking suppression, Q, as follows:

$$N=(k*j*W^2/2)*K*\sin(I) \quad (9),$$

$$R=N*\sin(D) \quad (10),$$

$$Q=N*\cos(D) \quad (11)$$

Where:

k—a coefficient of a hydrofoil hydrodynamic drag [3], j—a water density,

W—a tangent water flow velocity (or an opposite total foil velocity),

K—a hydrofoil area,

I—a water flow attack angle.

The analysis of the formulas 3, 6, 7, 9, 10 shows, the rocker is longer the swings amplitude, Y, is greater and the flow tangent angle, F, is greater, hence the hydrofoil deflection, D, and the attack angle, I, may be made greater and, accordingly (10), the propulsion, R, will be greater too. Additionally the water current speed, W, increases and, therefore, the normal hydrodynamic head, N, and the thrust, R, also increases. This is why we have to prolong the rocker length, L.

2.5. An example of RP-ship's design with a telescopic R-propulsor.

Figure 7A:
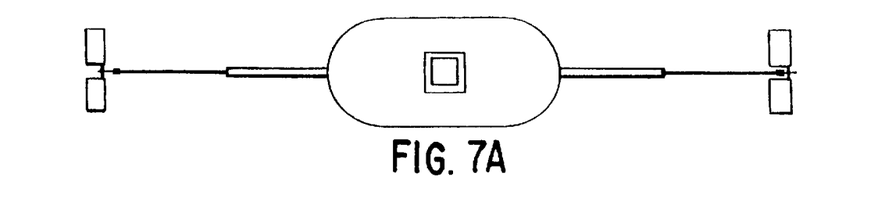
Figure 7B:
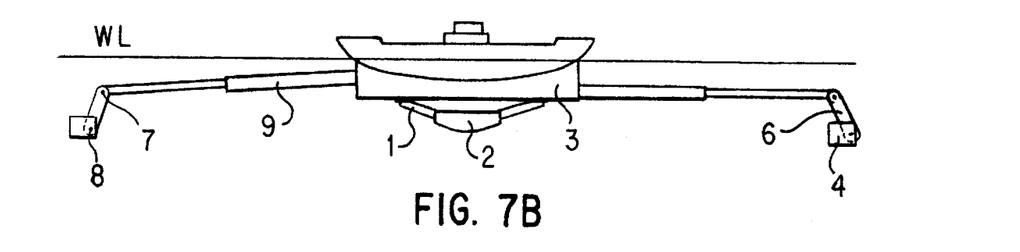

One of possible RP-ship's designs (FIG. 7) contains a telescopic rocker with sliding sections 9, on both sides from its middle part—the roll-damping keel 3. The R-propulsor is shown in two states (a—spread and b—retracted). Sometimes dimensions of that telescopic rocker may be changed to adjust to the conditions of navigation. There are two converters <rocking/propulsion> 4, on both of its extremities and the P-keel 2, of a telescopic design. When the R-propulsor is in the folded state the hydrofoils can be raised up above the waterline WL (FIG. 7b) and can be serviced. We have an example of two planes hydrofoils, named as bifoils.

Figure 7C:
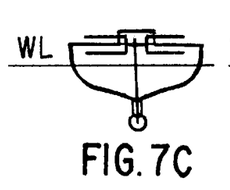
Figure 7D:
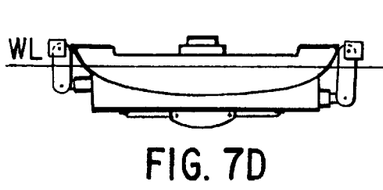
Figure 7E:
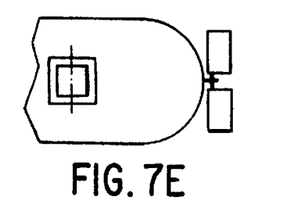

Each converter (FIG. 7c) is composed of the bifoil 4 on the shaft 8 saving a parallel state to the rocker 3 while the holder 6 may be turned to any angle on the knuckle axle 7 by the rope driver 14,16 (FIG. 7c). The parallel state of the bifoil is kept because of the compensatory gear 18, which reverses the foil's shaft 8 with key 19, when the holder is turned. It is necessary to turn the holder down, when a sea runs high, and to turn it up to an air for the converter's examination and maintenance. The shaft turnings are needed to keep the bifoil in the identical angle position as the rocker in order to save the permanent conditions of the bifoil work.

The bifoil can be deflected from the almost horizontal rocker state only by the flow hydrodynamic head. But its deflection is limited by the same compensatory mechanism. The bifoil angle motion is transmitted by the key 19, the shaft 8, the sprocket 18, the chain 17, the sprocket 15, the shaft 7, the lever 13, the rope I 1, to the spring 10. That spring is tensed from the RP-ship by an other rope and it returns the bifoil 4, to the horizontal position, when the dynamic head weakens or changes the act direction.

If the second spring instead the first parallel spring 10, will be tensed from the RP-ship then the rope link 12 starts to work and with the its lever, the shaft 7, the sprocket 15, and so on it will turn the bifoil at 180 degrees, so the converter will be set to reverse. If only one bifoil will be reversed then RP-ship will stop her motion under the rocking propulsion. If both bifoils will be reversed then the rocking propulsion will be reversed and RP-ship will start to run back.

The RP-ship with the telescopic R-propulsor can freely maneuver in the constrained conditions, if it has the auxiliary engine and propulsor or it is towed by the tugboat.

3. Solution for the third problem: restriction for rocking process.

3.1. The method for the description of a ship pitch behavior.

This problem is solved along with first and second one, when we tried to make a ship to be more compliant and dutiful for the seas. A ship of the pendulum type and a ship with the neutral mass position (in a pitch center) but with the small pitch inertia moment have the trim, t (angle diversity of a sea slope and a ship pitch) equal zero. An ordinary ship may stoop (pitch) more than a sea slope because it continues to bend according to the inertia and a weight capsize moment, specially, if a ship free pitching process and the seas frequencies are in resonance.

To describe and explain the behavior of the different ship types we use diagrams of an influence of sea slope, s, onto a pitch angle, p. An angle of sea slope, s, is on abscissa and a pitch angle, p, is an ordinate of them. We can see (FIG. 8a) a development of a rocking process as a function of a wave process, shown by a point on the abscissa axis, which is moving in turn to right, S=1, and to left, S=−1. It shows the maximum slope angle, S, on the ends, but with different signs. The point on an ordinate, p, shows the ship pitch angle. Thus the trace of the cross point of both coordinates, x shows the pitch process, forced by seas.

Figure 8A:
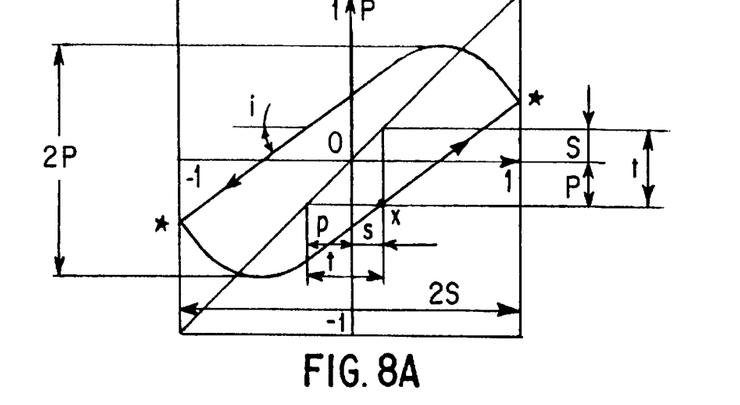

If the cross point, x, goes along or parallel to the diagonal, both (ship and sea slope) angle motions have identical speeds. If the cross point, x, goes trace gently sloping, then a ship has the rocking angle speed smaller than the sea. It means the efficiency of the R-propulsor and the ship speed will be lower as well. The relative pitch speed equals tg (i), where (i) is the loop line inclination (FIG. 8a).

Figure 8B:
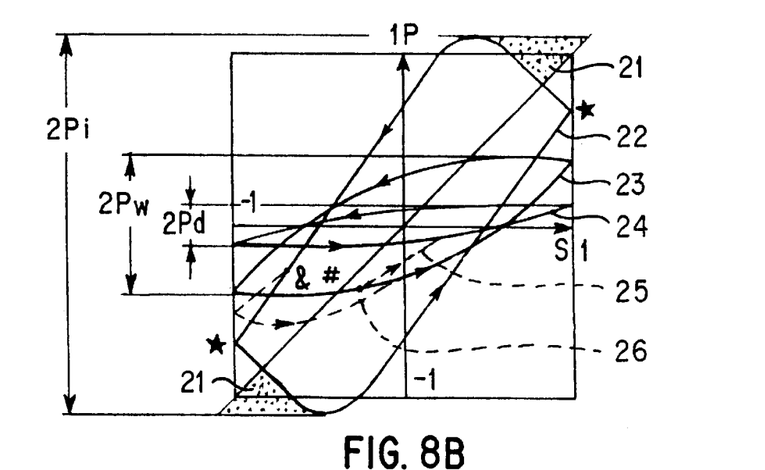
Figure 8C:
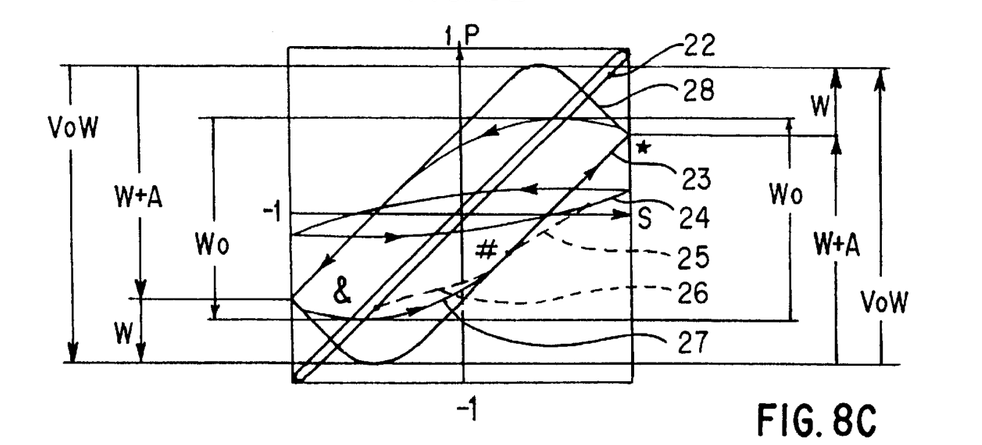

A vertical (or identical horizontal) distance between a cross point, x, and the diagonal is a trim, t. If a trim is greater, the pitch force moment and its work are greater as well. When we look at the ship behavior loop (FIG. 8) we understand easier, why some rocking process is better than other. So the area of a pitch hysteresis loop below the diagonal shows the volume of work (VoW) of the sea while the pitch changes from -P to P. And the area upper diagonal shows VoW of the sea while the pitch changes from P to -P.

We suppose here waves are equal (standard) or greater than a ship length.

3.2. The pitch behavior of an ordinary ship, equipped with R-propulsor.

Before ship starts, the R-propulsor has an idle run and does not prevent the ship from pitching free (line 22, FIG. 8b). All ships in the world up to the third millennium have only the idle regime of the pitch and heave. The diagram shows pitch behavior of an ordinary ship, having a great pitch moment of inertia and the high location of the mass center.

The line 22 shows the ship pitch process when the ship free pitch period approaches to the period of waving. The pitching ship may accumulate the wave energy more and more with an increasing speed (track loop raises more) and with the increasing ship trim in the deceleration zone 21. Seas execute the useless work only for the sake of "play the ship rocking". Its working load is the dissonance between sea waving and a ship rocking. This dissonance is watched as the trim relatively a wave slope and sea impacts, and it is caused by the ship capsize moment, the moments of pitch inertia and joined water mass.

But if the R-propulsor of such a ship is switched to the work regime (in point &) and hydrofoils can not be deflected free like weather-vane (but can only elastic strength against rocker's swings into the water) then the speed of the pitching is sharply reduced. The pitch process through line 26 passes to the work regime loop 23 of the ordinary ship, rigged by R-propulsor. The pitch range, 2P, becomes lower, because the additional load is added to the first hurtful loading, which absorbs the sea energy first. As a result less sea energy is left for the swaying of the R-propulsor. It means the forces on hydrofoils are not great and their horizontal projections are comparatively small.

This fact, however, does not exclude the ordinary ships from the renovated class of RP-ships. But the speed of their motion just under waves action can be lower than the RP-ships, which are just designed to run faster with the greatest reception, conservation, transmission and conversion of sea energy to a ship propulsion.

3.3. The pitch behavior of RP-ships.

The first type of this ship has wide body of shallow hull with the mass center located at the pitch center and with a small pitch moment of inertia. The second ship is identical to the first, but it is made as the pendulum type, thus the mass center is located under ship bottom. Both ship types have (FIG. 8c) identical pitch loop (line 22) for the idling regime (the hydrofoils work like whether-vane). The loop exactly repeats diagonal. That means the ship pitch always follows the wave slopes and it does not receive energy any more.

When the R-propulsor is turned on, the line 26 from the point &, the loops of pitch processes for the different ship type have separated so that the first type of ship has line 27 and the second type has the line 28. The first type of ship stops angle motion at the point (*) and waits for the slope back motion because this type of ship does not accumulate energy with P-keel to continue an independent pitch. Thus its R-propulsor does not produce a vital propulsion on the loop paths, where the sea slope goes from 1 to 0 and from −1 to 0. The volumes of pitch work are shown by arrows Wo on the diagram sides.

In contrast to the first one the second type of ship (pendulum type) has the kinetic energy of P-keel and continues her angle motion, when wave slope motion has reached a limit and turns back. Only after the back trim arises the second type ship begins to pitch back but now with help of potential energy of P-keel. Because the trim is constant or almost constant the ship has the pitch speed equal to the sea slope angle speed or optimal for the propulsion.

The R-propulsor work strike of that ships contains path W+A, where it uses and accumulates the sea energy, and the path W, where they spend the accumulated energy of the P-keel. So the sum volume of the propulsive work of the R-propulsor strike is shown by the arrow VoW and the loop area under and above the diagram diagonal.

3.4. Third problem solution.

Now it is clear that if we want to navigate by the RP-ship, we have to let her to pitch effectively. But in contrast to ordinary ships, which may sway super wave slope (FIG. 8b)

the RP-ship always has range of work pitch less than waves have. Thus if the RP-ship is switched to work regime, it automatically solves the third problem. Besides, if we want to stop pitch, we have to put the R-propulsor in the damping regime (points #, lines 25 on FIGS. 8b,c), then its hydrofoils can not elastically deflect and create the thrust but can only prevent swings of the R-propulsor. The damping loops of the RP-ship are shown on FIGS. 8b,c (lines 24).

The ratio of the pitch angle region to the sea slope angle region, P/S, shows the rocking output of wave energy and may be used in many propulsive, energetic and force estimates during the ship designing. In particular, we may use that ratio for choosing area of hydrofoils. If we put value 5–10% to P/S during the damping regime (FIG. 8), we can find the required foil areas for the assigned rocker span and then we can calculate parameters of a new or an ordinary ship, renovated to RP-ship.

The next advantage of the RP-ship of the pendulum type is the ability to convert the heaving energy into the pitch process. Moreover the ship of pendulum type can pitch in state beam on to the sea. This makes the conversion of the rocking more effective. All types of RP-ship can go any directions of the wave motion, including head into the sea.

We have to remark that the RP-ship of the pendulum type (with P-keel) can have a significant harmful rolling if we do not take precautions. One way for that is to make a keel-fin under ship's bottom, which can stop the rolling and can be made along with the keel-rocker.

4. Solution for other problems.

4.1. The building of RP-ships.

The well-know ship manufacturing processes are suitable because the RP-ship body may be identical to the ordinary ship body but, for best results it is better if the ship hull is wider with a rounded bottom. There we have no serious changes technology. The same statement we can say about the making of the P-keel and the keel-fin (the roll damper), because here we can to use the technology, well-know in the yacht production. Hence, all statements below are related to building of new RP-ships as well as to the renovating of the ordinary ships.

In particular, the production, the assembly and installation of the R-propulsor also have no serious difficulties. If that device has a telescopic design, there are minimal problems for the ship industry to put it under the ship bottom in the ordinary factory environment. If the rocker of the R-propulsor has made long unfolding, the mounting it under bottom can be accomplished in quiet water by:

1) putting the propulsor down with two boats, 2) bringing it up under the ship, 3) setting it under bottom, 4) conducting the submarine arrange works, 5) connecting up to the ship control system, 6) checking the capacity to work, 7) sea testing and making ready.

4.2. The RP-ship's steering and maneuvering.

All existing methods and means of steering and maneuvering for the ordinary ships and crafts may be used here. But RP-ship has additional possibilities for steering with the use of the left and the right turns of the hydrofoils or the vertical rudder parts of them. That design can be used for an increasing of the efficiency of hydrofoils along with reducing their area and weight. The big rocker span allows us to create a turn steering moment greater than for an ordinary ship with the same rudder area.

Figure 7F:
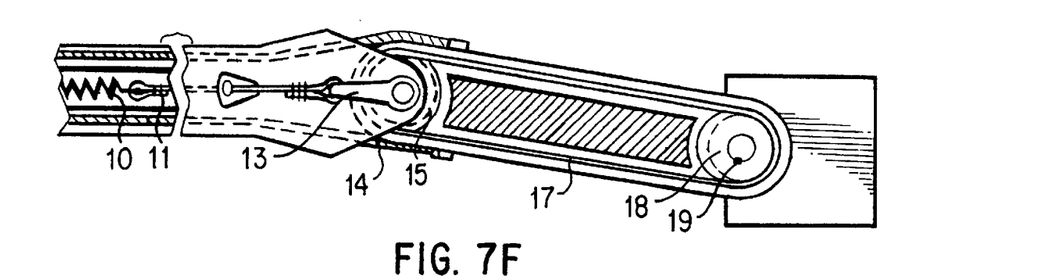
Figure 7G:
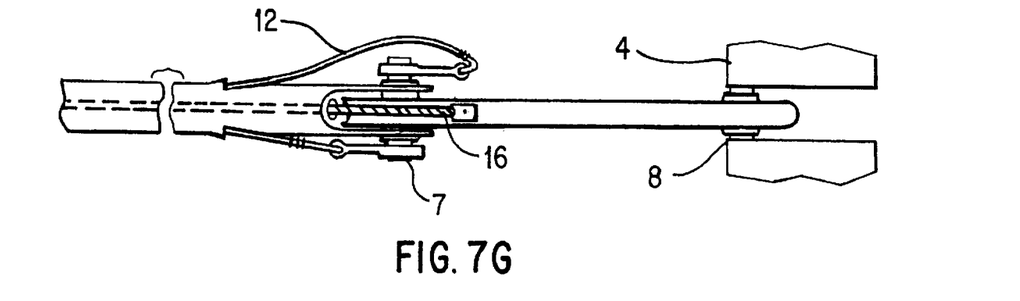

The next positive property of the R-propulsor is the easy way to change propulsion from maximal to zero and from zero to maximal value but in reverse direction by changing the eccentricity E of the hydrofoil (see FIGS. 6b,6c). At last there is a possibility to break the RP-ship very powerfully by taking the hydrofoils in the vertical position. For that it will be enough to vertically turn (FIGS. 7f, 7g) both levers, 13, with the ropes, 11 and 12. These actions have to be done from a remote control post as well as other control functions.

4.3. Interactions RP-ships with an ordinary ships and a fleet.

Before the rocking propelled and powered ships will appear, we will use only RP-ships, rigged with the ordinary electric power system and with auxiliary engines, propulsor and steering gear for motion and maneuvers into bays, canals and ports. This relates to RP-ships with the telescopic R-propulsor and the turned foil holders (FIGS. 7a–e). These RP-ships can do the complete cycle of the transportation work without the outside help.

In contrast to these other RP-ships with the unfolding R-propulsors can not maneuver in straitened conditions. They need to be served by ordinary tugboats in order to moor or they have to be loaded or unloaded in sea by auxiliary boats. Some of that RP-ships in its turn may be powerful tugboats and be used for towing ordinary ships on sea and ocean ways. There is the problem of searching for the best ways of co-operating other kinds of ships and a fleet with the RP-ships.

TECHNICAL PUBLICATIONS:

[1]—Nikolaev M. N., Savitsky A. L., Senkin Yu. F. Fundamentals of efficiency calculation of a foil-type wave propulsion system. Russia, St.-Petersburg, the publishing house "Shipbuilding", 1995.

[2]—N. N. Evgraphova, V. L. Koran. Course of physics. Russia, Moscow, the publishing house "Highest school", 1973.

[3]—V B. Jinkin. Theory and ship design. Russia, St.-Petersburg, the publishing house "Shipbuilding", 1995.

What I claim as my invention is:

1. A method of ship propulsion based on conversion of wave generated pitching or/and heaving motions to propelling forces via an outwardly fore and aft extended stiff longitudinal keel-boom having a pair of foils mounted on its opposite fore and aft extremities and being pivotally elastically and generally horizontally, said method comprising the pivotal deflection and translation of mounted foils in response to wave generated oscillation of the fore and aft extending keel boom, thereby resulting in a horizontally directed propulsion force.

2. A method of ship propulsion as set in claim 4, wherein to derive and convert the maximum wave energy to ship's propulsive forces the pendulum properties are imparted to said ship via location of the ship gravity center below a pitch center thereof, and it can be lowered or lifted additionally with a bob hanging under the bottom in order to accord the desired pendular motion of the ship with said wave generated oscillations.

3. A method of ship propulsion as set in claim 1 or claim 2, wherein the ship pitching motion is artificially generated by an on-board oscillator, comprising a flywheel which can be being alternatively rotated and accelerated in opposite directions, thereby imparting an artificial pitching motion to the ship hull and the keel-boom, said motion should be synchronized and added to wave generated motion in order to increase the total propulsive power of the foils.

4. A method of ship propulsion as set in claim 1 or claim 2, wherein said keel-boom is pivotally attached lengthwise to the ship bottom, and the pitching motion is artificially generated by an oscillator built-in to a hollow middle part of the keel-boom, and comprising of a flywheel which can be alternatively rotated and accelerated in opposite directions, thereby imparting a pitching motion only to said keel-boom, but which can be locked to the bottom in order to synchronize and add both artificial and wave generated rocking processes.

5. A method of ship propulsion as set in claim 1 or claim 2, wherein said keel-boom may be telescopic and rigged by turning terminal foil holders, so that fore and aft arms of the keel-boom can be retracted, and the foils can be lifted out of water near the ship by the holders turning in order to achieve better ship maneuverability, protection and easier maintenance of the foils.

6. A method of ship propulsion as set in claim 1 or claim 2, wherein both of said keel-boom extremities are rigged by turning foil holders, each holder having a stabilizing mechanism which elastically keeps each foil mainly horizontal independent from the holder inclination, and via this mechanism it is possible change stabilized foil position by 90 or 180 degrees in order to stop or to reverse the ship.

7. A pitching or/and heaving rocking motion propelled ship, comprising of a hull and an outwardly fore and aft extending longitudinal stiff keel-boom, having a pair of foils mounted on its fore and aft extremities, each foil being pivotally elastically and generally horizontally; during rocking motion, said keel-boom swings with the foils in the water, thereby compelling each foil to deflect from a horizontal position and translate, thereby producing a horizontal propulsive force.

* * * * *